June 3, 1947.  D. A. GROSSMAN  2,421,418
TRANSPORT BLOWER
Filed May 1, 1945  2 Sheets-Sheet 1
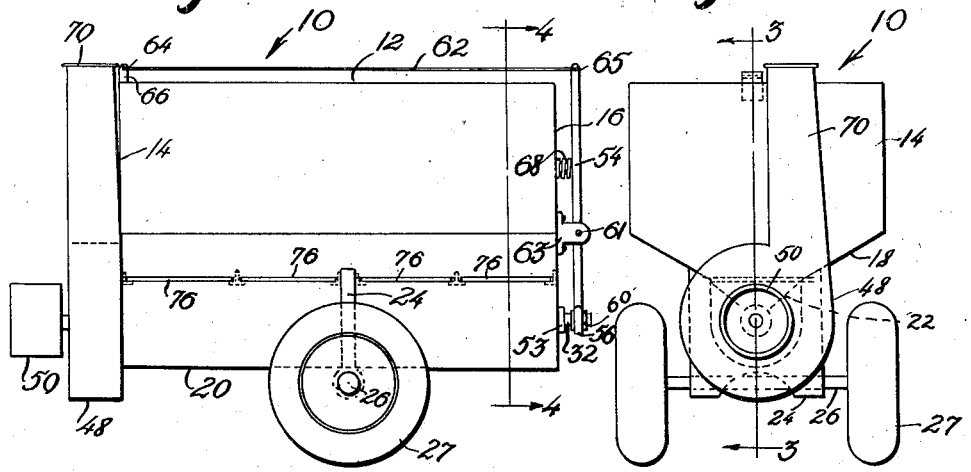
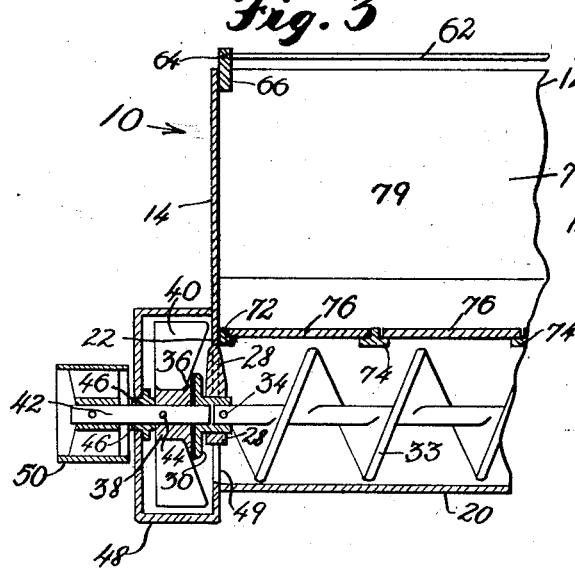
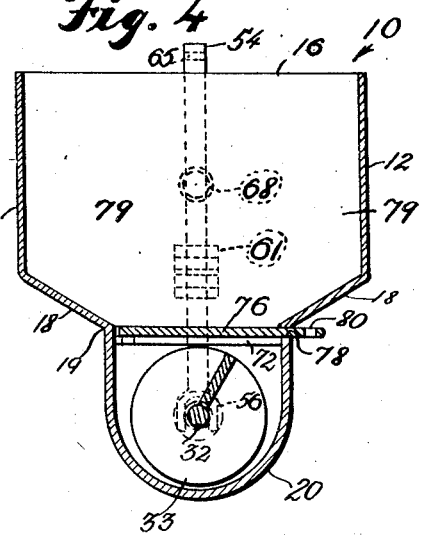
INVENTOR.
Darwin A. Grossman
BY Victor J. Evans & Co.
ATTORNEYS INVENTOR.
Darwin A. Grossman
BY Victor J. Evans & Co.
ATTORNEYS Patented June 3, 1947

2,421,418

UNITED STATES PATENT OFFICE 2,421,418

TRANSPORT BLOWER

Darwin A. Grossman, Elkhart, Ind.

Application May 1, 1945, Serial No. 591,253

4 Claims. (Cl. 302—50)

This invention relates to a transport blower for use in transporting grain and like materials.

An object of the invention is to provide a machine that can be used to transport grain from the field to the barn and discharge it into a bin therein.

Another object of the invention is to provide a machine that can be incorporated as part of a forage harvester.

With the above and other objects in view the nature of which will more fully appear as the description proceeds, the invention consists in the novel construction, combination and arrangement herein fully described and illustrated in the accompanying drawings in which:

Fig. 1 is a side elevation of an embodiment of the invention.

Fig. 2 is an end view thereof.

Fig. 3 is a sectional view on the line 3—3 of Fig. 2.

Fig. 4 is a sectional view on the line 4—4 of Fig. 1.

Figure 5:
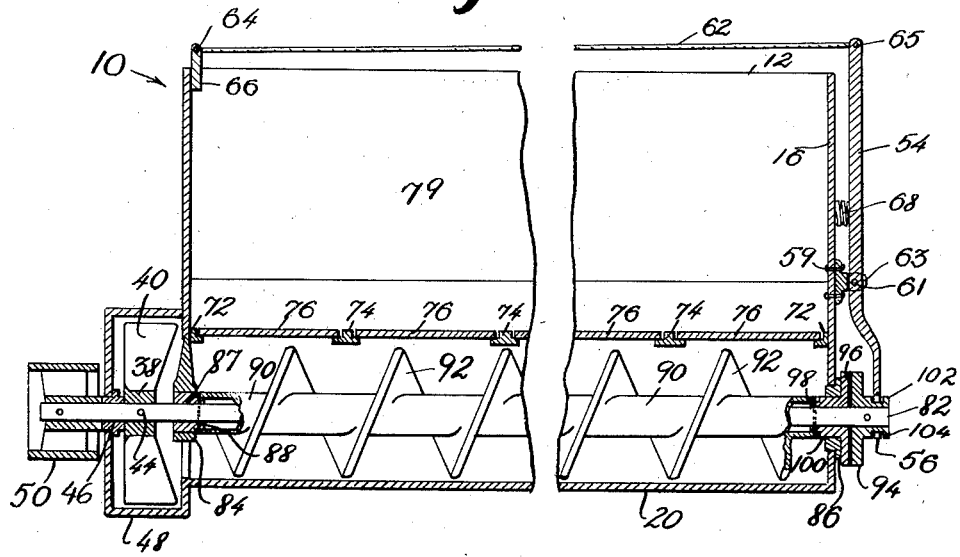
Fig. 5 is a vertical sectional view of a modification of the machine.

Referring more in detail to the drawings, 10 designates the body of the machine which is substantially rectangular in shape and has side walls 12 and end walls 14 and 16.

The bottom of the body 10 of the machine is provided with downwardly inclined portions 18 that merge at 19 into a downwardly depending curved bottom auger housing 20. The end walls 14 and 16 conform to the shape of the bottom and are therefore provided with depending curved bottom lower end portions 22 and 23.

The body 10 is provided with a running gear or axle supporting means 24 equipped with an axle 26 and wheels 27, in order that the machine may be easily transported where desired.

The lower end portion 22 is provided with a bearing 28, which is adapted to receive and have journalled therein a friction clutch plate 30. The end of an axle 32 of an auger 33 being secured therein by any well known securing means 34. The plate 30 is adapted to engage with a similar plate 36 formed integral with the hub 38 of a fan 40.

The fan 40 is secured to an axle 42 by any well known securing means 44 and the axle 42 is journalled in a bearing 46 fixed in the fan housing 48 which is formed on the lower portion 22 of the side wall 14 and has an opening 49 therein communicating with the auger housing 20.

One end of the axle 42 is slidably journalled in the plate 30 and the other end has affixed thereto a pulley 50 which can be driven from the power take-off of a tractor not shown, or any other similar type of power furnishing means either attached to a vehicle or a stationary motor.

The axle 32 extends longitudinally of the body 10 and the auger 33 is formed integral therewith, the other end of the axle 32 is journalled in the lower portion 23 in bearing 53.

A lever 54 is provided with a forked end 56 which engages in a circular groove formed in the sleeve or collar 60 which is secured to the end of the axle 32.

The lever 54 is pivotally mounted on a pin 61 fixed in the bracket 63, which is mounted on the end wall 16 by bolts 59. The other end of the lever 54 has an opening 65 therein to receive one end of the operating rope 62 the other end of which is received in an opening 64 in the upstanding arm 66.

Interposed between the lever 54 and the end wall 16 upwardly of the bracket 63 is a spring 68.

The spring exerts outward pressure against the lever 54 to keep the plates 30 and 36 engaged, and disengagement thereof is obtained by pulling the rope 62.

The housing 48 has an upstanding discharge outlet 70 which extends slightly beyond the end wall 14. The height of the outlet can be increased at any time by connecting a flexible conduit to the end of the outlet.

The end walls 14 and 16 are provided at the terminal 19 of the inclined portions 18 and the curved bottom portions 22 and 23 with a transversely extending angle iron support 72 and at spaced intervals thereto and parallel therewith are T-shaped supports 74.

The supports 72 and 74 have transversely extending slides 76 which extend beyond and are slidably mounted in the longitudinal slot 78 in the housing 20.

The slides 76 form the bottom of a compartment 79 into which the grain or similar material is placed.

When the machine has been transported to the desired location and power has been applied to the pulley and the fan and auger are operating the slides can be withdrawn one at a time by grasping the hand holds 80 to permit the material to fall into the auger housing and be conveyed into the fan housing from where it is blown out of the housing outlet for disposition.

In the modification of the invention shown in

Figure 6:
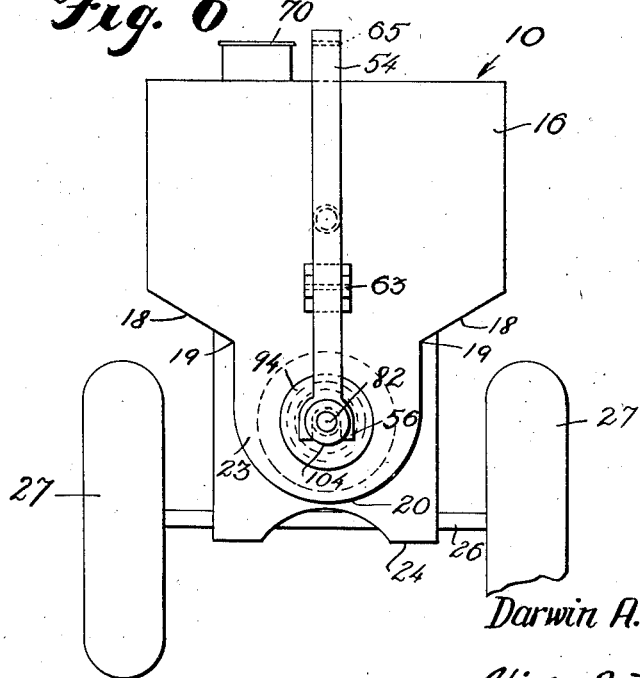
Fig. 6 is a view of the device of Fig. 5 at the end opposite that shown in Fig. 2 of the modification.

Figs. 5 and 6, there is only one axle 82 used in the operation of the fan 40 and the auger 92.

On one end of the axle 82 is secured the pulley 50 and the axle is journalled in bearing 46 in the housing 48, and bearings 84 and 86 in the side walls 14 and 16 respectively. The fan 40 is secured to the axle 82 in the housing 48 and the axle is provided with a bushing 87 which is journalled in the bearing 84.

The bushing 86 is provided with an integral extending portion 88 which is of a smaller diameter and is adapted to receive the tubular axle 90 of the auger 92. The other end of the axle 82 has a clutch plate 94 secured thereto which is adapted to engage with a similar clutch plate 96 which is secured to the auger axle 90 by means of an extending portion 98 which is of smaller diameter than the hub 100 of the clutch plate 96.

The hub 102 of the clutch plate 94 is provided with a circular groove 104 which is adapted to receive the forked end 56 of the lever 54, the lever is pivotally mounted on bracket 63 and the clutch plates 94 and 96 are kept in engagement with each other by means of the spring 68. Disengagement thereof is obtained by pulling the rope 62.

The other parts of the machine are identical, the modification thereof resulting in the mode of operation of the auger and fan.

It is to be understood that the auger housing is kept empty except when it is desired to empty the contents of the machine.

As stated a flexible conduit connected to the outlet will permit the contents to be directed in any desired direction.

When this machine is to be used with a forage harvester, the forage is delivered thereto and when the body has been filled, the machine is transported to the storage bins and then unloaded.

The device will save manpower and will also aid handicapped people to perform the whole process alone and with as much ease as if they were mowing or raking the hay.

From the above it will be seen that a transport blower has been provided which is simple in construction and easily operated, whereby the material is quickly loaded, transported and unloaded.

It will be understood, therefore, by those skilled in the art that the embodiment of the invention herein disclosed accomplishes the objects of the invention. It also has other advantages and uses than those herein particularly referred to, also that various changes and modifications may be made without departing from the spirit of the invention, and since the embodiment disclosed herein is only illustrative of the device, the invention is not to be understood as restricted thereto, since this may be modified within the scope of the appended claims without departing from the spirit and scope of the invention.

Having thus described the invention, what is claimed as new and desired to be secured by Letters Patent is:

1. A device of the character described comprising a body portion having a storage compartment and an auger housing in parallel relation to and in vertical alignment with the storage compartment, supports mounted interiorly of the body and transversely thereof, slides carried by said supports to separate said body into the storage compartment and auger housing, a fan housing of greater cross sectional dimension than said auger housing positioned on said body and communicating with said auger housing, means for delivering material from said auger housing to said fan housing, an outlet on said fan housing for discharging said material therefrom and means mounted on said body for transporting said body.

2. The invention as described in claim 1, wherein said delivery means is provided with pulley means adapted to be connected to a power takeoff of a tractor for operating said delivery means.

3. The invention as described in claim 1, wherein said delivery means is provided with pulley means which is adapted to be connected to a power takeoff of a tractor for said delivery, and clutch means is provided for engaging and disengaging said pulley means from said delivery means.

4. The invention as described in claim 1, wherein said delivery means comprises an auger.

DARWIN A. GROSSMAN.

REFERENCES CITED

The following references are of record in the file of this patent:

UNITED STATES PATENTS

| Number | Name | Date |
|---|---|---|
| 540,105 | Kirshman | May 28, 1895 |
| 603,077 | Day | Apr. 26, 1898 |
| 707,992 | Warner | Aug. 26, 1902 |
| 772,606 | Brossman | Oct. 18, 1904 |
| 1,455,329 | Fippenger | May 15, 1923 |
| 1,631,119 | Collins | June 7, 1927 |
| 2,129,252 | Whiteside | Sept. 6, 1938 |